United States Patent [19]

Takechi et al.

[11] Patent Number: 5,751,136
[45] Date of Patent: May 12, 1998

[54] CHECKING METHOD OF CONNECTION BETWEEN SECONDARY BATTERY AND BATTERY CHARGER AND CHECKING DEVICE

[75] Inventors: Hiroaki Takechi; Tomohiro Ono, both of Iwata, Japan

[73] Assignee: Yamaha Hatsudoki Kabushiki Kaisha, Iwata, Japan

[21] Appl. No.: 702,649

[22] PCT Filed: Dec. 25, 1995

[86] PCT No.: PCT/JP95/02649

§ 371 Date: Nov. 5, 1996

§ 102(e) Date: Nov. 5, 1996

[87] PCT Pub. No.: WO96/20513

PCT Pub. Date: Jul. 4, 1996

[30] Foreign Application Priority Data

Dec. 26, 1994 [JP] Japan .................. 6-323084

[51] Int. Cl.$^6$ ........................................ H02J 7/04
[52] U.S. Cl. ........................................ 320/150
[58] Field of Search ........................ 320/2, 30, 32, 320/35, 48, 39, 150

[56] References Cited

U.S. PATENT DOCUMENTS

| | | | |
|---|---|---|---|
| 3,784,892 | 1/1974 | Zelina | 320/40 |
| 5,049,804 | 9/1991 | Hutchings | 320/20 |
| 5,302,887 | 4/1994 | Ishiguro et al. | 320/32 |
| 5,363,031 | 11/1994 | Miller et al. | 320/21 |
| 5,521,443 | 5/1996 | Imura et al. | 307/10.2 |
| 5,563,493 | 10/1996 | Matsuda et al. | 320/6 |
| 5,592,069 | 1/1997 | Dias et al. | 320/30 |
| 5,668,039 | 9/1997 | Fernandez | 320/29 |

FOREIGN PATENT DOCUMENTS 6-48346   6/1994   Japan .................. 320/35

Primary Examiner—Peter S. Wong
Assistant Examiner—Gregory J. Toatley, Jr.
Attorney, Agent, or Firm—Knobbe, Martens, Olson & Bear LLP

[57] ABSTRACT

An object of the invention is to propose a judgment method and device for connection between a secondary battery and a battery charger, in which it is unnecessary to use special wiring or other elements for the judgment. A battery charger A includes charging unit 11 for supplying electric current to the secondary battery B through a connector 6, and a charge-control unit 10 for controlling the charging unit 11. The secondary battery B includes a temperature sensing element 5 for sensing temperature of the secondary battery B. The temperature sensing element 5 has terminals, one of which is connected to a direct current power supply of the battery charger A via the connector 6 when the connection is secured. The charge-control unit 10 is connected to one of the terminals of the temperature sensing element 5, so that the output voltage of the temperature sensing element 5 is input to the charge-control unit 10 when the connection is secured. Furthermore, the charge-control unit 10 stores a standard range of the voltage of the temperature sensing element 5 and decides that the connection is not secured when the voltage input to the charge-control unit 10 is out of the standard range.

6 Claims, 6 Drawing Sheets

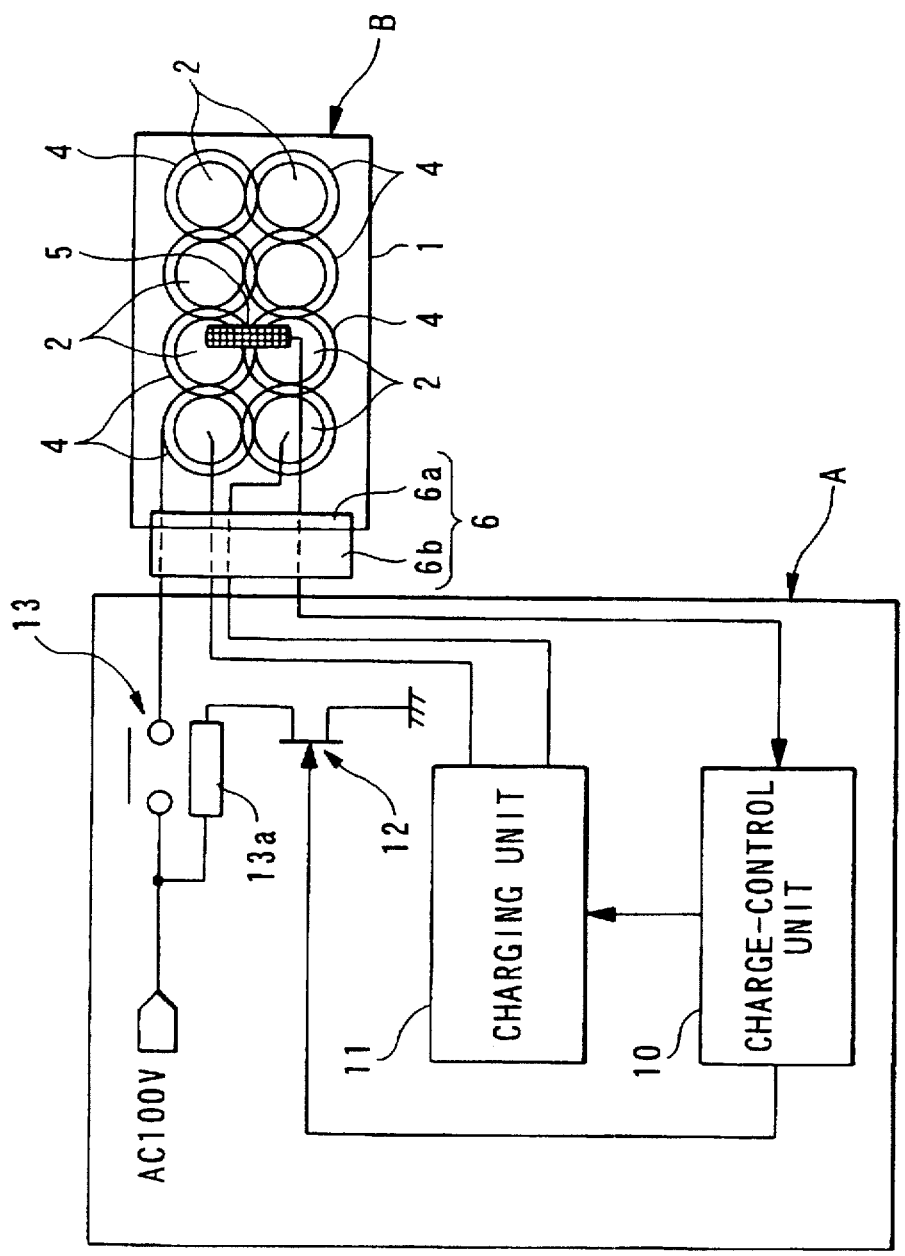

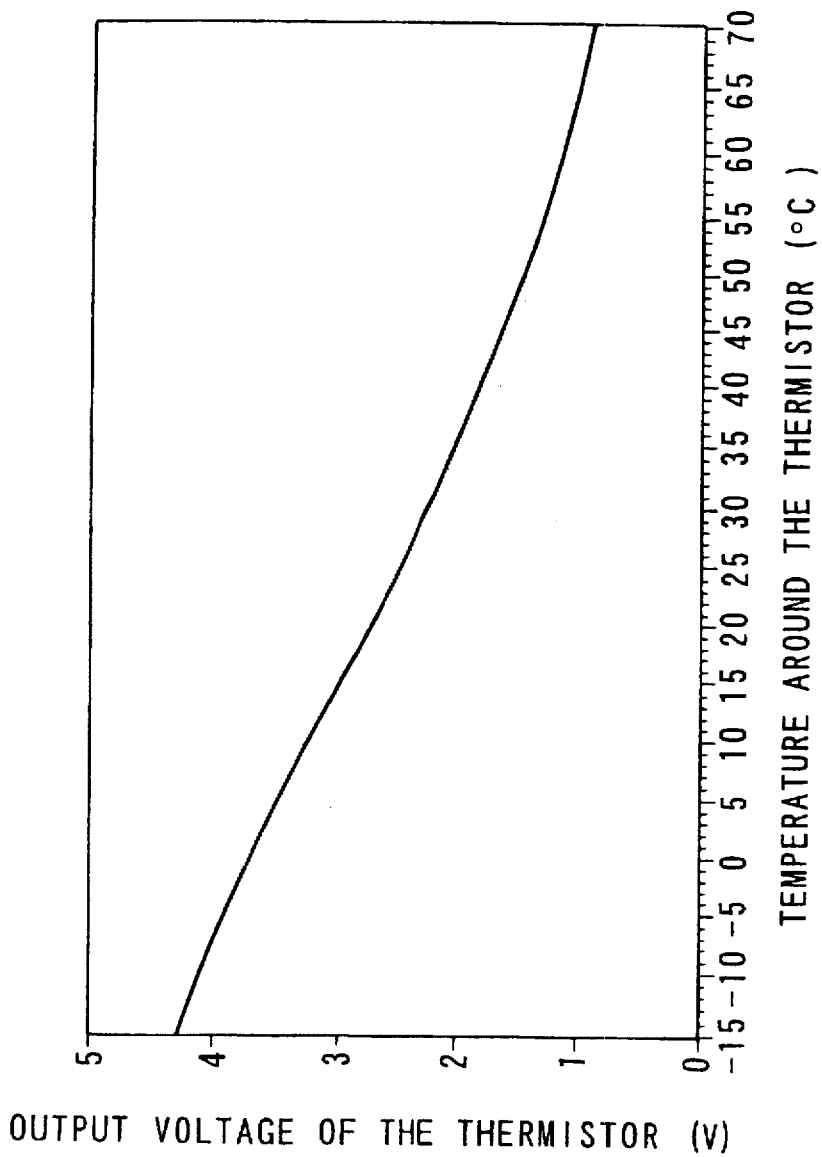

CHECKING METHOD OF CONNECTION BETWEEN SECONDARY BATTERY AND BATTERY CHARGER AND CHECKING DEVICE

TECHNICAL FIELD

The present invention relates to a method for checking a connection between a secondary battery and a battery charger, and a device therefor. The secondary battery is preferably used for a power source of, e.g., an electric vehicle such as a human-driving vehicle with an auxiliary power source.

BACKGROUND ART

A secondary battery, which is mounted on, for example, a human-driving vehicle with an auxiliary power source, is recharged by means of a battery charger connected to a domestic electrical outlet. When the secondary battery is connected to the battery charger, which is also connected to the domestic electrical outlet, an indication, e.g., an LED is turned on for representing that the connection is secured. Conventionally, various methods have been utilized for checking whether the connection between the battery charger and the secondary battery is secured or not. One is that the voltage of the secondary battery is detected. Second, special checking terminals are provided with a connector between a battery charger and a secondary battery, and it is decided as to whether a current flows through the connector or not.

However, by means of the former method, the check is impossible when an overcurrent has been discharged from the secondary battery or when a short circuit exists inside the secondary battery. Also, according to the latter method, the number of terminals increase, so that the production is costly.

DISCLOSURE OF THE INVENTION

Accordingly, it is an object of the present invention to propose a method and a device for checking the connection between a secondary battery and a battery charger, in which the production cost is not increased and the connection can be checked in spite of the condition of the secondary battery.

To resolve the above-described problems, in accordance with the invention stated in claim 1, provided is a method for checking connection between a secondary battery and a battery charger for charging the secondary battery, the connection being made by a disconnectable connector. The method is characterized in that:

the battery charger comprises charging means for supplying electric current to the secondary battery through the connector, charge-control means for controlling the charging means, and a direct current power supply;

the secondary battery comprises a temperature sensing element for sensing temperature of the secondary battery, the temperature sensing element having terminals, one of which is connected to the direct current power supply of the battery charger via the connector when the connection is secured, so that the temperature sensing element outputs voltage according to the temperature of the secondary battery; and the charge-control means is connected to one of the terminals of the temperature sensing element, so that the output voltage of the temperature sensing element is input thereto when the connection is secured, the charge-control means storing a standard range of the voltage of the temperature sensing element and deciding that the connection is not secured when the voltage input to the charge-control means is out of the standard range.

In accordance with the invention stated in claim 2, provided is a device for checking connection between a secondary battery and a battery charger for charging the secondary battery, the connection being made by a disconnectable connector, the secondary battery including a temperature sensing element for sensing temperature of the secondary battery. The device is characterized in that it is situated in the battery charger and comprises:

a direct current power supply for supplying an electric current to the temperature sensing element when the connection is secured, so that the temperature sensing element outputs voltage according to the temperature of the secondary battery;

voltage detection means for detecting the output voltage of the temperature sensing element;

storage means for storing a standard range of the voltage of the temperature sensing element; and decision means for deciding as to whether the voltage detected by the voltage detection means is within the standard range or not.

OPERATION

When the secondary battery is connected securely to the battery charger, the output voltage of the temperature detecting element is provided for the charge-control means. On the contrary, when the secondary battery is disconnected from the battery charger, the voltage provided for the charge-control means is not related to the temperature detecting element and is out of the standard range of the output voltage of the temperature detecting element. If the charge-control means detects that the input voltage of the charge-control means is out of the standard range, the charge-control means decides that the connection between the secondary battery and the battery charger is not secured.

BRIEF DESCRIPTION OF THE DRAWINGS

FIG. 1 is a schematic view showing a circuit constituted of a battery charger and a secondary battery to which the present invention is applied;

FIG. 2 (B) represents another example of the circuit constituted of the thermistor and the charge-control unit;

FIG. 3 is a graph showing a relation between temperature around the thermistor and output voltage of the thermistor;

BEST MODE FOR CARRYING OUT THE INVENTION

Figure 2A:
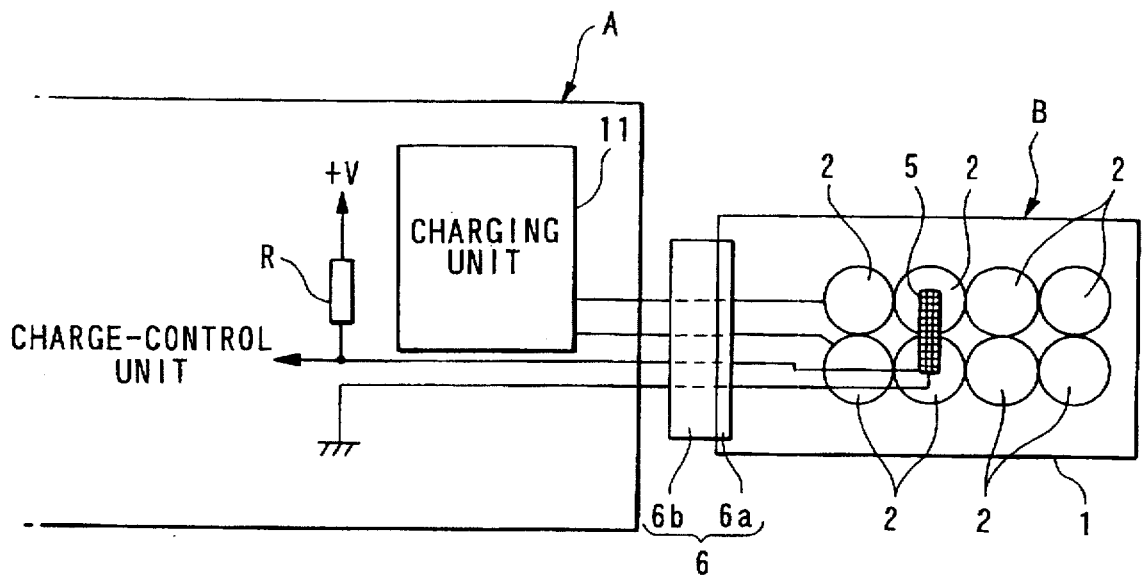
FIG. 2 (A) represents a circuit constituted of a thermistor and a charge-control unit shown in FIG. 1.

With reference to FIGS. 1 through 5, an embodiment of the present invention will be described. FIG. 1 is a schematic view showing a circuit constituted of a battery charger A and a secondary battery B. As shown in this drawing, the secondary battery B comprises a battery case 1. A plurality of Ni-Cd cells 2 are connected in series inside the battery case 1. Belt-shaped heaters 4 are wound around the cells 2, respectively. These heaters 4 are also electrically connected in series. Inside the battery case 1, a thermistor (temperature sensing element) 5 is disposed. The terminals of the cells 2, heaters 4, and thermistor 5 are situated in a receptacle 6a of a connector 6.

Next, in the battery charger A in this drawing, reference numeral 10 depicts a charge-control unit for controlling various elements in the battery charger A. The charge-control unit 10 provides a control signal for a charging unit 11. The charging unit 11, which is connected to a domestic electrical outlet (AC 100 V in FIG. 1), controls the charging the secondary battery B under control of the charge-control unit. In addition, the charge-control unit 10 provides a relay-control signal for a gate of an FET 12, so that an exciting current flows or stops to a coil 13a, whereby a relay 13 is turned on or off.

When the relay 13 is turned on, a current is supplied from the domestic electrical outlet through the connector 6 to the heaters 4, so that the heaters 4 heat up the cells 2. The output voltage of the thermistor 5 is detected by the charge-control unit 10, and the charge-control unit 10 controls the relay 13 on the basis of the output signal of the thermistor 5 representing the temperature of the cells 2. A plug 6b of the connector 6 is coupled detachably in the receptacle 6a. The battery charger A includes a volt meter (not shown) inside thereof. The volt meter detects the voltage of the secondary battery B, and the voltage value of the secondary battery is input to the charge-control unit 10.

Figure 2B:
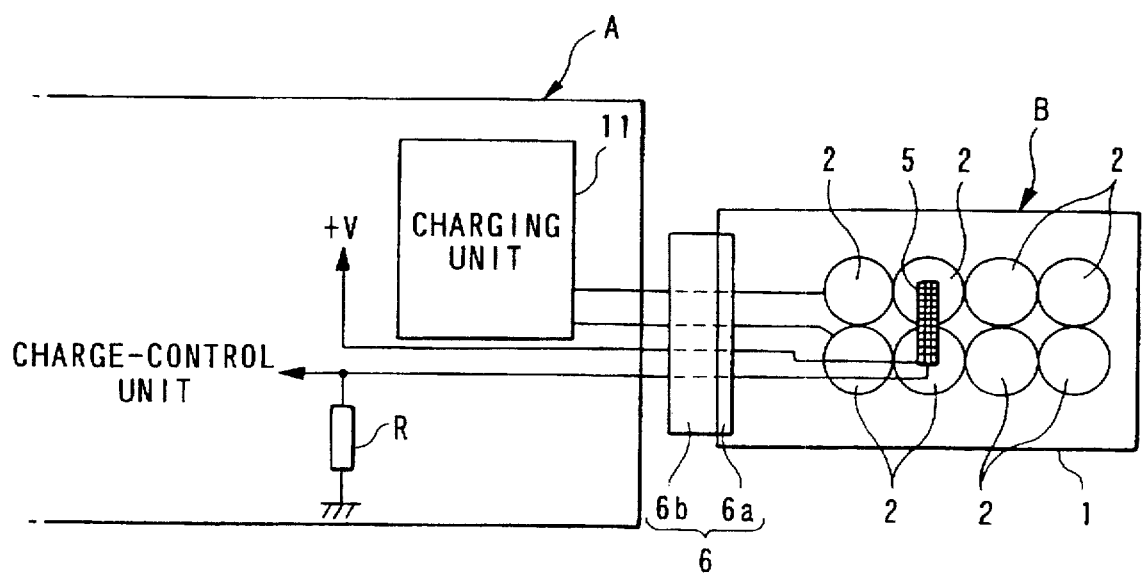

FIG. 2 (A) represents a circuit constituted of the thermistor 5 and the charge-control unit 10 in detail. This circuit is a main characteristic of this embodiment. As shown in the drawing, while one terminal of the thermistor 5 is earthed via the connector 6, the other is connected to a direct current power supply (+V in the drawing) via the connector 6 and a resistor R when the plug 6b is securely engaged with the receptacle 6a. The voltage of the power supply is, e.g., +5 V. An intermediate portion of the line from the resistor R to the connector 6 is connected to the charge-control unit 10. In this circuit, the output voltage of the thermistor 5 is varied due to the temperature around the thermistor 5. FIG. 3 is a graph showing a relation between the temperature around the thermistor 5 and the output voltage of the thermistor 5 which should be provided for the charge-control unit 10. As clearly understood by this drawing, as the temperature around the thermistor 5 rises, the resistance of the thermistor 5 decreases, so that the output voltage is reduced.

Since the temperature around the thermistor 5 is usually between 0° and 40° C. when the battery charging is started, the output voltage provided for the charge-control unit 10 is between 1.8 and 3.7 V as understood by FIG. 3. However, the voltage of +5 V, from the power supply, is input directly to the charge-control unit 10 if the connection at the connector 6 is not secured, i.e., the plug 6b is not securely plugged in the receptacle 6a. Therefore, the voltage provided for the charge-control unit 10 is near the voltage of +5 V from the power supply. Accordingly, the charge-control unit 10 can decide as to whether the connection at the connector 6 is secured or not in accordance with the value of the input voltage of the charge-control unit 10. In order to conduct the decision, in a memory (not shown) of the charge-control unit 10, a standard range, e.g., 1.5 to 4.0 V, is stored. If the input voltage to the charge-control unit 10 is out of this range, the charge-control unit 10 decides that the connection at the connector 6 is not secured.

More specifically, the voltage of the direct current power supply of the battery charger A is divided by one or more resistors (not shown), so that 4.0 V, which is the highest of the standard range, is obtained, and this voltage is provided for a negative terminal of a comparator (not shown). The positive terminal of the comparator is connected to a line which should be connected, at the connector 6, to the terminal of the thermistor 5. Therefore, the output voltage of the thermistor 5 is input to the positive terminal as log as the connection at the connector 6 is secured. When the input voltage of the charge-control unit 10 is in excess of 4.0 V, the output of the comparator becomes high level. In this case, it is determined that the connection between the battery charger A and the secondary battery B is not secured at the connector 6. On the contrary, when the input voltage of the charge-control unit 10 is lower than 4.0 V, the output of the comparator is low level. In this case, it is determined that the connection at the connector 6 is secured.

In this example, if the connection at the connector 6 is not secured, the input voltage of the charge-control unit 10 is higher than 4.0 V absolutely. Accordingly, it is unnecessary to check whether the input voltage is lower than 1.5 V which is the lowest value of the standard range although the lowest value is also stored in the memory, so that it is omitted to provide another comparator for comparing the input voltage of the charge-control unit 10 with 1.5 V.

FIG. 2 (B) represents another example of the circuit constituted of the thermistor 5 and the charge-control unit 10. In this example, one terminal of the thermistor 5 is connected to a direct current power supply (+V in the drawing) via the connector 6 when the plug 6b is securely engaged with the receptacle 6a. The voltage of the power supply is, e.g., +5 V. The other terminal of the thermistor 5 is connected to the charge-control unit 10 via the connector 6 when the plug 6b is securely engaged with the receptacle 6a. An intermediate portion of the line from the charge-control unit 10 to the connector 6 is connected to the ground through a resistor R. In this circuit, as the temperature around the thermistor 5 rises, the resistance of the thermistor 5 decreases, so that the output voltage increases.

Usually, the output voltage provided for the charge-control unit 10 is between 1.5 and 3.7 V. However, the output voltage of the thermistor 5 is not input to the charge-control unit 10 if the connection at the connector 6 is not secured, and thus the input voltage to the charge-control unit 10 is between 0 and 1 V. Accordingly, the charge-control unit 10 can decide as to whether the connection at the connector 6 is secured or not in accordance with the value of the input voltage of the charge-control unit 10.

More specifically, the voltage of the direct current power supply of the battery charger A is divided by one or more resistors (not shown), so that 1.5 V, which is the lowest value of the above-mentioned standard range, is obtained, and the voltage is provided for a positive terminal of a comparator (not shown). The negative terminal of the comparator is connected to a line which is connected, at the connector 6, to the terminal of the thermistor 5. Therefore, the output voltage of the thermistor 5 is input in the negative terminal as long as the connection at the connector 6 is secured. When the input voltage of the charge-control unit 10 is in excess of 1.5 V, the output of the comparator becomes low level. In this case, it is determined that the connection between the battery charger A and the secondary battery B is secured at the connector 6. On the contrary, when the input voltage of charge-control unit 10 is lower than 1.5 V, the output of the comparator is high level. In this case, it is determined that the connection at the connector 6 is not secured.

In this example, if the connection at the connector 6 is not secured, the input voltage of the charge-control unit 10 is lower than 1.5 V absolutely. Accordingly, it is unnecessary to check whether the input voltage is higher than 4.0 V which is the highest value of the standard range although the highest value is stored in the memory, so that it is omitted to provide another comparator for comparing the input voltage of the charge-control unit 10 with 4.0 V.

Figure 4:
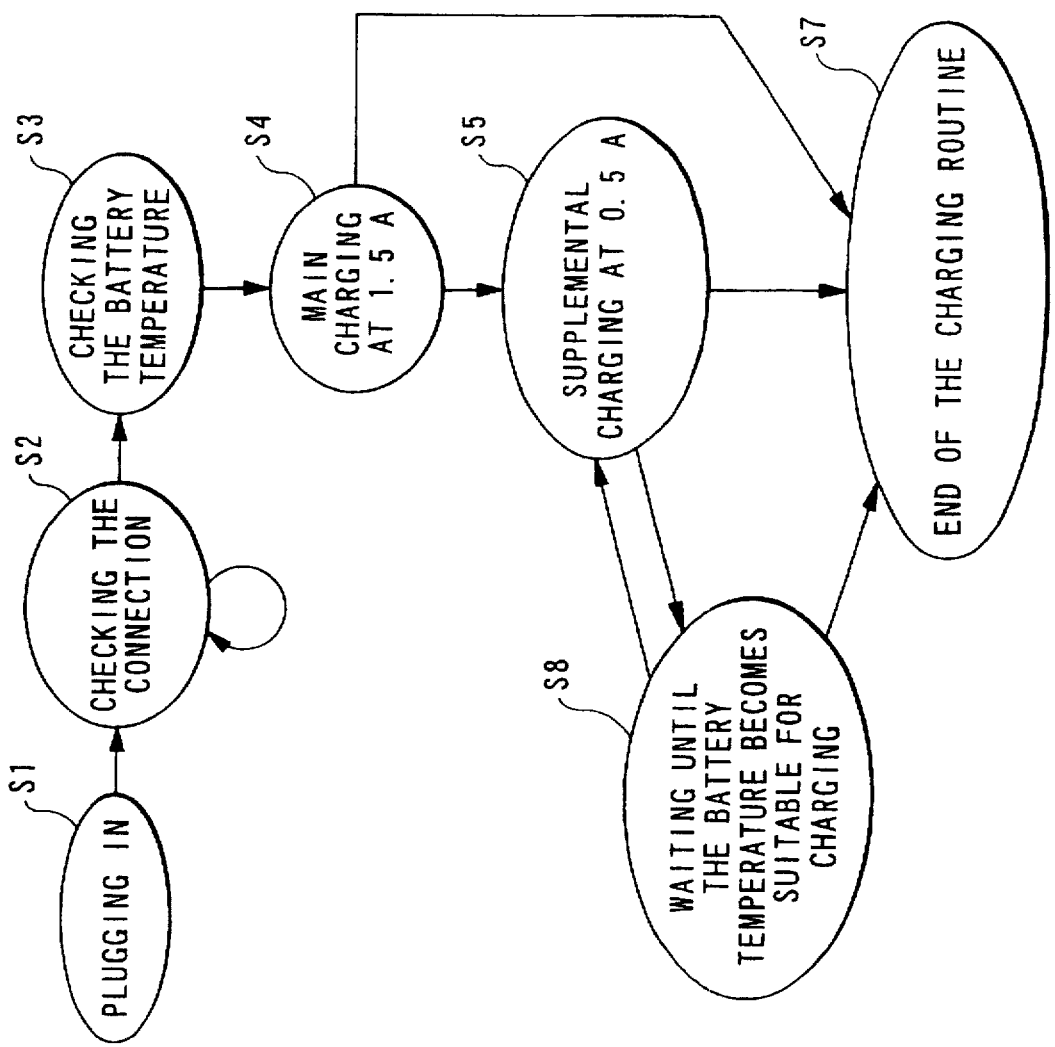
FIG. 4 is a state transition diagram representing a first embodiment of the charging routine to which the method of the present invention is applied.

Next, a checking method for connection between the above battery charger A and the secondary battery B will be described. This checking method is conducted during a battery-charging routine. FIG. 4 is a diagram showing a state transition of the battery charger A. In this diagram, sequential procedures from Step S1 to Step S7 consists of a normal processing in a case that the charging of the secondary battery is normally conducted. This normal processing will be first described. In this charging routine, in order to inform the user of the charging state, an LED is used. According to the state of the charging, the lighting of the LED is continued, stopped, intermittenly operated at longer intervals, or intermittenly operated at shorter intervals. In the description hereinafter, the switching manners of the LED will be also mentioned.

In order to start charging, the user connects the battery charger A to the domestic electrical outlet at Step S1, so that the charge-control unit 10 of the battery charger A is started to be operated. Next, the charge-control unit 10 decides, at Step S2, as to whether the plug 6b of the battery charger A is plugged in the receptacle 6a of the secondary battery B or not according to the input voltage of the charge-control unit 10.

In Step S2, if the temperature around the thermistor 5 is, for example, 15° C., the voltage of the thermistor 5 provided for the charge-control unit 10 should be 3 V as shown in FIG. 3. Accordingly, as long as the plug 6b is plugged in the receptacle 6a securely, the input voltage of the charge-control unit 10 is in the standard range stored in the charge-control unit 10. Therefore, the charge-control unit 10 decides that the connection between the receptacle 6a and the plug 6b is secured, and then the routine proceeds to Step S3. On the contrary, if the plug 6b is not plugged in the receptacle 6a, the input voltage of the charge-control unit 10 is out of the standard range stored previously. In the example shown in FIG. 2 (A), the input voltage is near +5 V which is the voltage of the direct current power supply. Thus, the charge-control unit 10 decides that the receptacle 6a and the plug 6b are disconnected from each other. In this case, the charge-control unit 10 repeats, in Step S2, the decision until the plug 6b is inserted into the receptacle 6a securely.

In Step S3, the charge-control unit 10 decides as to whether the battery temperature detected by the thermistor 5 is in a prescribed range between $T_1$ and $T_2$° C. or not. When the temperature of the secondary battery B is below $T_1$° C., the charge-control unit 10 turns on the relay 13 for switching the heaters 4 on. On the other hand, when the temperature of the secondary battery B is above $T_2$° C., the charge-control unit 10 waits until the temperature of the secondary battery B falls to be below $T_2$° C. The reason why the battery temperature is checked before the start of the charging is that if the secondary battery B is charged at a low temperature below $T_1$° C., the charging efficiency will be remarkably reduced, so that the secondary battery is likely undercharged, and a part of the battery electrolyte inside the cells 2 will be vaporized, so as to shorten the lifetime of the cells 2. Moreover, it is known by experiments that if the charging is conducted at a high temperature, the lifetime of the secondary battery is also affected. For the same reason, as will be described later, the highest limit of the temperature during the charging process is prescribed at $T_3$° C. The charging is started as far as the temperature is below $T_2$° C. which is lower than $T_3$° C.

Until the routine proceeds to Step S3, the LED is not turned on, but when the routine proceeds to Step S3, the LED is switched to light up intermittently at longer intervals. Thus, the user can know that the charging routine transits to the temperature-checking state of Step S3.

If the temperature of the secondary battery B is in the prescribed range, the routine proceeds to Step S4. In Step S4, the cells 2 are provided with electric charges, in other words, the cells 2 are recharged. In Step S4, the LED is turned on to light up continuously, so that the user can be aware that the charging has started. This charging is conducted at a constant current value, e.g., 1.5 A. At the beginning of the charging, a timer (not shown), contained in the charge-control unit 10, is started to operate. If a certain time period ($t_1$) has passed since the start of the timer, the charging is stopped and the routine proceeds to Step S7, and then the routine ends, as will be described later. In addition, if the battery temperature is below $T_1$° C. in Step S4, the routine will proceed to Step S7, as will be also described later in detail.

In Step S4, after the start of the charging, the battery voltage rises increasingly, and then becomes constant. After that, the voltage of the secondary battery B rises again and peaks once before the secondary battery B is fully charged. After the peak, the voltage drops continuously. When it is detected that the voltage of the secondary battery B drops by $\Delta V$ from the peak value, the charging at the constant current of 1.5 A is finished, and the routine proceeds to Step S5.

However, at the initial stage of the charging, the voltage of the secondary battery B is not stable, and the voltage of the secondary battery B sometimes decreases by a value more than $\Delta V$. Therefore, in this charging routine, the detection of the voltage-drop $\Delta V$ is omitted in a certain time period after the start of the charging. For this purpose, a detection-delay timer (not shown) contained in the charge-control unit 10 is operated.

The main charging at 1.5 A is also finished when it is detected that the battery temperature reaches the above-mentioned highest limit (finishing temperature), i.e., $T_3$° C. above $T_2$° C. In other words, if the voltage-drop $\Delta V$ is detected or the finishing temperature $T_3$° C. is detected, the routine proceeds from Step S4 to Step S5. The finishing temperature $T_3$° C. is prescribed above the highest limit value ($T_2$° C.) of the starting temperature since it is normal that the temperature of the secondary battery B rises during the charging. In this charging routine, since the main charging at 1.5 A is finished on the basis of the battery temperature, the secondary battery B is prevented from being damaged.

If the finishing temperature $T_3$° C. is prescribed below a certain value, the detection of the finishing temperature $T_3$° C. may be omitted in a certain time period after the start of the charging. For example, if the finishing temperature $T_3$° C. is prescribed equal to $T_2$° C., it will be detected that the temperature of the secondary battery B reaches $T_3$ ($T_2$)° C. immediately after the start of the charging although it is detected that the initial temperature is below $T_2$° C. before Step S4. Such a problem will occur by errors of the temperature-detection although the temperature of the secondary battery B falls for the reason of the endothermic reaction in a short period after the start of the charging. However, if it is omitted to detect the finishing temperature $T_3$° C. in a certain time period after the start of the charging, it is prevented that the charging is finished immediately after the charging is started.

Next, in Step S5, the reason why the routine proceeds from Step S4 to Step S5 is referred, and the switching manner of the LED is varied on the basis of that reason. That is, if the detection of the voltage-drop ΔV is the reason for proceeding to Step S5, the LED is turned off and it does not light continuously. On the other hand, if the reason for proceeding to Step S5 is the detection of the finishing temperature $T_3°$ C., the LED is switched to light up intermittently at shorter intervals. Thus, the user can know that the Step S4 has ended for the reason of an abnormal temperature of the secondary battery.

In Step S5, the cells 2 are charged at a constant current value, e.g., 0.5 V, which is lower than the value in Step S4. This secondary charging is called supplemental charging in the following description. The reason of the supplemental charging is that the cells 2 of the secondary battery B have been sometimes not fully charged when the voltage-drop ΔV has been detected in the main charging at 1.5 A. However, after the voltage-drop ΔV is detected, if the main charging at 1.5 A is continued, the cells 2 may be overcharged. Therefore, in the embodiment of the charging routine, the charging is supplemented at the lower current value (0.5 A), so that the secondary battery is prevented from being overcharged and undercharged. The supplemental charging is conducted for a prescribed time period ($t_2$) using with the timer (not shown), and after this period, the routine proceeds to Step S7 for ending.

If the normal charging has been conducted before Step S7, the LED is maintained to be off. Consequently, the LED is not lighted up in Steps S5 and S7. Thus, there is likelihood that the user disconnects the secondary battery B from the electrical outlet in Step S5, so as to finish the charging compulsorily. However, since the charging has substantially completed at the finish of Step S4, there is no problem for the usage of the secondary battery.

The normal processing has been described hereinbefore. Next, procedures when abnormalities happen will be described. First, in the main charging at 1.5 A of Step S4, there is likelihood that the voltage-drop ΔV nor the finishing temperature $T_3°$ C. are not somehow detected for a long time. In this case, if the main charging at 1.5 A is continued, the secondary battery will be damaged by overcharging and so on. Therefore, in Step S4, if a certain time period ($t_1$) has passed since the start of the main charging at 1.5 A, the charging is stopped and the routine proceeds to Step S7 for ending. In this case, the routine does not pass through the supplemental charging at 0.5 A (Step S5) since it is considered that the secondary battery B has been charged substantially fully by the main charging at the constant current of 1.5 A for the certain time.

In addition, it is assumed that the surrounding temperature of the secondary battery falls to be below $T_1°$ C. in a case that, for example, after starting of the charging in a room, a heater for the room is switched off. If the charging is continued in this case, a part of the battery electrolyte inside the cells 2 will be vaporized, so as to shorten the lifetime of the cells 2. Therefore, if the battery temperature falls to be below $T_1°$ C. in Step S4, the routine proceeds to Step S7, and the LED is switched to light up intermittently at shorter intervals for informing the user of the temperature has been abnormal.

However, in a case that the temperature of the secondary battery B has been near $T_1°$ C. before starting the charging, it is possible that the battery temperature falls to be below $T_1°$ C. by the endothermic reaction immediately after the starting of Step S4. In this case, it is inconvenient to stop charging. Therefore, the detection of the battery temperature is omitted in a certain time period after the start of the charging, using with the detection-delay timer, as similar to the omission of the finishing temperature $T_3°$ C.

Furthermore, if the charging is conducted when the battery temperature is above $T_3°$ C., the quality of the secondary battery deteriorates as mentioned above. Thus, when the battery temperature reaches the finishing temperature $T_3°$ C. in Step S4, it is necessary to avoid that the routine proceeds to Step S5 for charging at the constant current value of 0.5 A. Accordingly, in Step S5, it is determined as to whether the battery temperature is above $T_3°$ C. or not. If the decision is made that the temperature is above $T_3°$ C., the routine proceeds to Step S8, and waits for that the battery temperature falls to the appropriate range in Step S8. Consequently, if the reason for proceeding to Step S5 is the detection of the finishing temperature ($T_3°$ C.) in Step S4, the routine proceeds to Step S8 immediately after the proceeding to Step S5.

The switching manner of the LED, in Step S8, is varied according to the step when the abnormality of the battery temperature has been detected, so as to inform the user of the step. That is, if the battery temperature has risen to be above $T_3°$ C. in the supplemental charging of Step S5 before proceeding to Step S8 (and the temperature has been normal in Step S4), the LED is turned off, and the lighting is stopped continuously in Step S8 since such an abnormality of the temperature is not a significant problem. On the other hand, if the battery temperature has reached $T_3°$ C. in Step S4, the LED is switched to light up intermittently in Step S8 since the abnormality is thoughtful.

In Step S8, if the battery temperature is above $T_3°$ C., the routine waits for that the secondary battery B is naturally cooled down and for that the temperature falls to a certain value slightly below $T_3°$ C. When the battery temperature falls to be below this value, the routine returns to Step S5 and the supplemental charging at 0.5 A is restarted. After the complete of the supplemental charging at 0.5 A, the routine proceeds to Step S7 for ending.

On the other hand, there is likelihood that the prescribed time period ($t_2$) has passed, in the waiting state of Step S8, since the beginning of the supplemental charging at 0.5 V. In this case, the routine proceeds to Step S7 and the charging ends.

If the main charging has been stopped in Step S4 since the battery temperature has fallen to be below $T_1°$ C., the LED is switched to light up intermittently in Step S7. The LED is controlled in the same manner if the main charging at 1.5 A has been stopped since the battery temperature has risen to be above $T_3°$ C. Accordingly, the user can know some kinds of significant problem about the temperature of the cells 2 have happened during the charging procedures. In other cases, the LED is turned off or maintained to be off in Step S7.

In the method for checking the connection between the secondary battery and the battery charger, it is decided as to whether the connection is secured at the connector 6 or not by means of the checking of the connection between the thermistor 5 and the charge-control unit 10. Accordingly, it is unnecessary to use special wiring or other elements for the checking, and thus, the checking can be conducted economically by a software programmed for the charge-control unit 10. Moreover, even if overcurrent has been discharged from the secondary battery B or a short circuit exists inside the secondary battery B, it is possible to check the connection in spite of such problems.

In addition to these advantageous effects of the present invention, the following advantages are achieved by the embodiment.

Since the charging at the constant current value in Step S4 is finished on the basis of one of the voltage of the secondary battery B, the temperature of the secondary battery B, and the charging time period, it is avoided that the charging is conducted under high or low temperature conditions or for very long time, so that the secondary battery B is prevented from being damaged. The lifetime of the secondary battery is prolonged.

Especially, in the embodiment, directly after the connection of the secondary battery B and the battery charger A, the charging is not started necessarily. Instead, the routine waits until the temperature of the secondary battery B falls to the prescribed range at Step S3. Accordingly, charging under high or low temperature conditions is surely avoided, so that the secondary battery is prevented from being damaged. Besides, since the charging is supplemented at 0.5 A after the main charging at 1.5 A, the secondary battery is prevented from being overcharged and undercharged. Also, since the current value of the supplemental charging is low, the secondary battery is prevented from being overcharged.

Furthermore, in the embodiment, since the cells 2 are surrounded by heaters 4, respectively, each of the cells 2 are uniformly heated up, and the temperature can be controlled exactly during the charging. In addition, since the connection at the connector 6 is checked by means of the circuit for the thermistor 5, the cost for production of the checking circuit is not enhanced very much.

Additionally, in the embodiment, if the battery temperature falls to be below $T_1°$ C. during the main charging at 1.5 A of Step S4, the routine proceeds to Step S7 and has ended. In this situation, the LED indicates that the abnormal temperature has been detected in a short time period after starting the charging. Accordingly, the user recognizes that the battery temperature has been extraordinarily low, and can make a suitable procedure, for example, restarting to charge in another room at an appropriate temperature.

B. Second Embodiment

Figure 5:
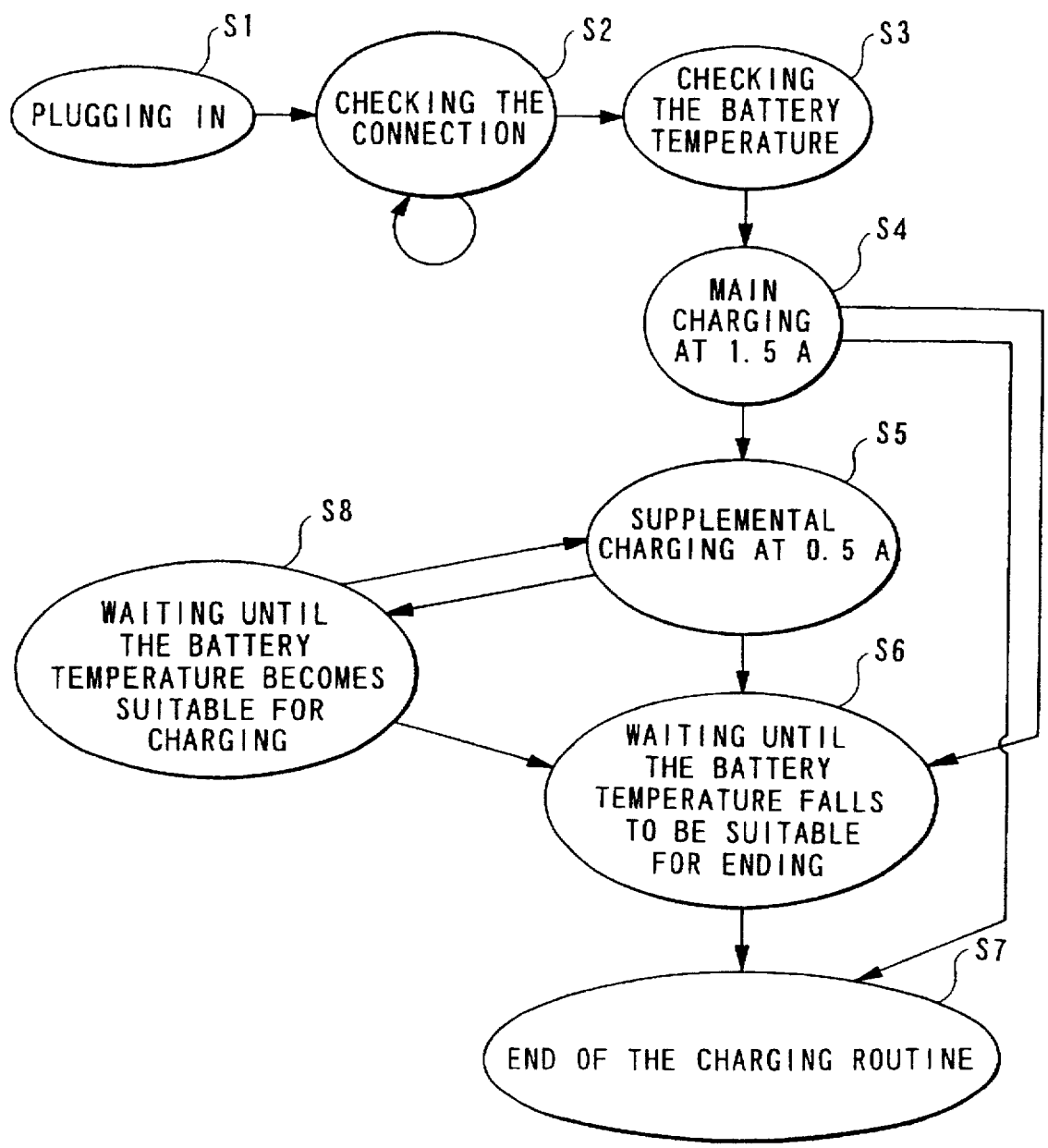
FIG. 5 is a state transition diagram representing a second embodiment of the charging routine.

Next, with reference to FIG. 5, a second embodiment of the charging routine will be described. The second embodiment is different from the above-described first embodiment in that Step S6 is added between Steps S5 and S7. In Step S6, the routine waits for that the temperature of the secondary battery falls to the suitable level for ending the charging routine. Additionally, if a prescribed time ($t_1$) has passed since the beginning of the charging in Step S4, the routine proceeds to Step S6. In addition, the routine may proceed from Step S8 to Step S6. Other procedures are the same as in the first embodiment, and therefore the description thereof is omitted.

In Step S4, if a prescribed time ($t_1$) has passed since the beginning of the main charging at 1.5 A, the charging is stopped, and then the routine proceeds to Step S6. In Step S6, the routine waits until the temperature of the secondary battery B falls. On the other hand, when the battery temperature falls to be below $T_1°$ C. in Step S4, the routine proceeds to Step S7 for ending, as similar to the first embodiment.

The reason for adding Step S6 is that the temperature of the cells 2 are high directly after the finish of charging. It is known that if the cells 2 are discharged in such a condition, various disadvantageous effects will occur, for example, the lifetime of the secondary battery will be shortened. Therefore, after the supplemental charging at 0.5 A of Step S5, the routine waits until the battery temperature falls to be a certain level slightly above $T_2°$ C. in Step S6, and then the routine ends. In Steps S5 and S6, the LED is continued to be on, and when the routine proceeds to Step S7, the LED is turned off. This switching manner indicates that the charging has been conducted normally.

In the second embodiment, after the routine proceeds to Step S8, it proceeds from Step S8 to Step S6 for waiting until the temperature drop as long as it does not return to Step S5, while in the first embodiment, the routine proceeds from Step S8 directly to S7 for ending.

In Step S8, the LED is maintained to be on in any case. When the routine proceeds from Step S8 via Step S6 to Step S7, the LED is turned off for indicating that the charging has ended.

However, if the battery temperature falls to be below $T_1°$ C. in the main charging at 1.5 A of Step S4, the routine proceeds to Step S7 for ending, but in this case, the LED is switched to light up intermittently at shorter intervals in Step S7, so as to indicate that the abnormality on temperature has occurred. In addition, if the battery temperature rises to be above $T_3°$ C. in Step S4, the LED is also switched to light up intermittently at shorter intervals in Steps S5, S6 and S7, so as to indicate the temperature abnormality.

In accordance with the second embodiment, the same advantages by the first embodiment can be achieved. In addition, the routine is ended after the temperature of the secondary battery B falls to be the certain temperature, and then the LED indicates that the routine is ended, as described above. Therefore, the user can use the secondary battery after the LED is turned off, thereby avoiding to use the secondary battery, and preventing it from being damaged. The lifetime of the secondary battery can be prolonged.

C. Third Embodiment

Figure 6:
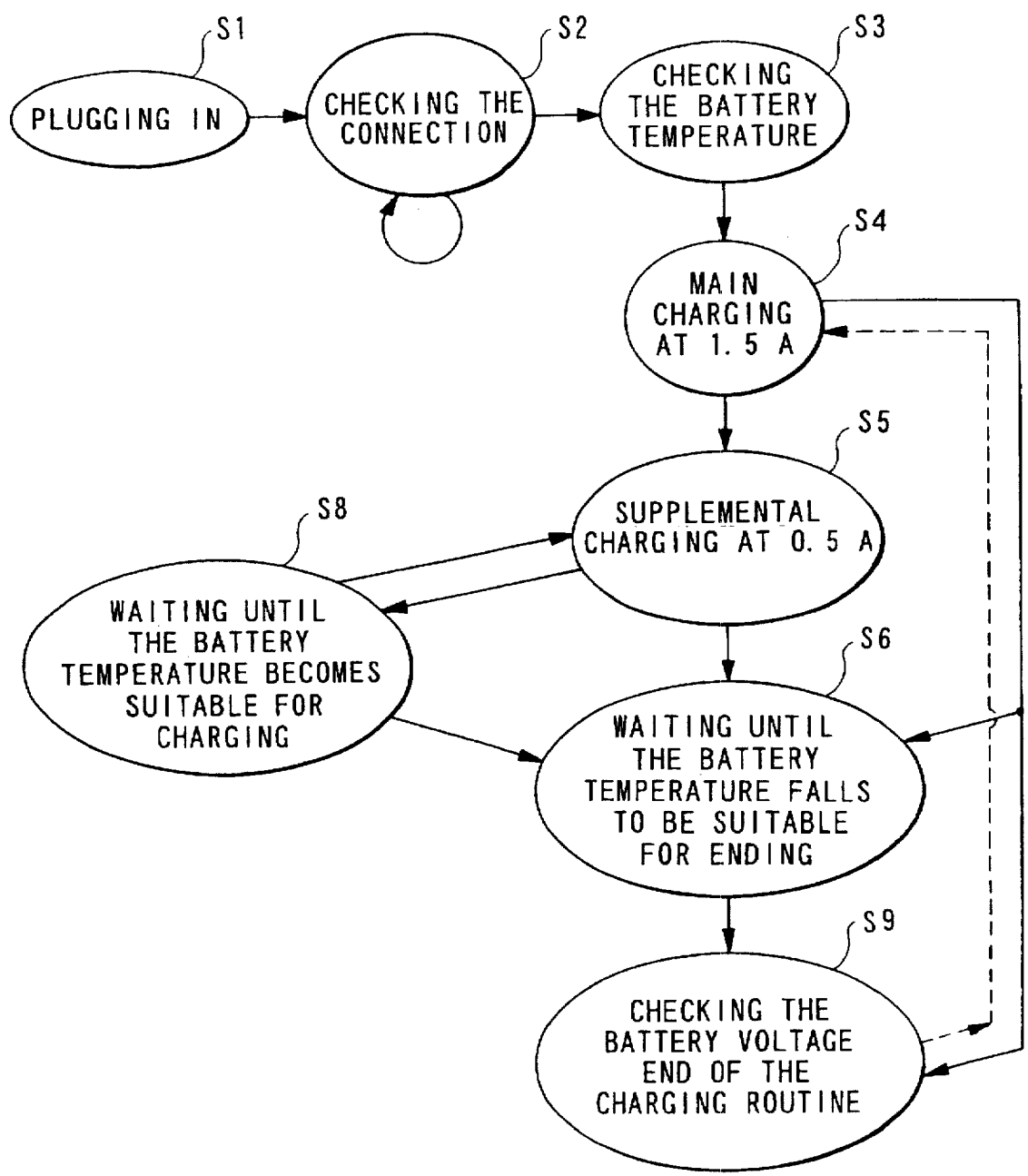
FIG. 6 is a state transition diagram representing a third embodiment of the charging routine.

Next, with reference to FIG. 6, a third embodiment of the charging routine will be described. The third embodiment is different from the above-described embodiments in that a complementary charging is added. That is, after Step S6, the voltage of the secondary battery is measured and it is decided as to whether the voltage reaches a certain usage-startable level or not at Step S9. If the decision is made that the voltage is less than this level, the routine returns to Step S4, so that the main charging at the constant current of 1.5 A is conducted again in order to complement the charging.

The routine does not proceed from the second main charging at 1.5 A to Step S5. Instead, it proceeds from the second main charging to Step S5 if the voltage-drop $\Delta V$ or the finishing temperature $T_3°$ C. has been detected, or if the prescribed time ($t_1$) has passed since the restart of the main charging at 1.5 A. On the other hand, if the battery temperature falls to be below $T_1°$ C. in the second main charging of Step S4, the routine proceeds to Step S9 for ending. In the third embodiment, the detection-delay timer is also used, and in a certain time period after the restart of the charging, it is omitted to detect the voltage-drop $\Delta V$ and to detect the battery temperature.

In accordance with the third embodiment, as similar to the second embodiment, the lifetime of the secondary can be prolonged. Furthermore, in the third embodiment, although self-discharging occurs so that the battery voltage decreases since the secondary battery is connected to the battery charger for a long time after the end of the charging, the main charging at 1.5 A is conducted again for complementing. Therefore, it is ensured that the battery voltage is above the usage-startable level as long as the end of the charging is indicated by the LED.

D. Variations and Modifications

Although the various features of the present invention has been described with reference to the accompanying drawings, it is to be understood that the invention is not limited to the foregoing description and the various modifications may be made in the invention as will be described in the following.

(1) The current values, charging time periods, and the temperature values in the main charging and the supplemental charging are optional.

(2) Although in the third embodiment, the routine returns to Step S5 from Step S9 in accordance with the decision at Step 9, the routine may return to Step S5 for conducting the supplemental charging at 0.5 A.

(3) In the second embodiment, if the certain time period ($t_1$) has passed since the start of the timer in the main charging at 1.5 A of Step S4, the routine proceeds to Step S6 and waits until the battery temperature falls for ending. However, it is possible in the same situation that the routine proceeds from Step S6 to S7 directly for ending.

(4) In the third embodiment, if the certain time period ($t_1$) has passed since the start of the timer in the main charging at 1.5 A of Step S4, the routine proceeds to Step S6 and waits until the battery temperature falls to be suitable for ending. However, it is possible that the routine proceeds from Step S6 directly to S9 for checking the battery voltage is appropriate for practical usage in the same situation. Additionally, in the second embodiment, it is possible to replace Step S7 by Step S9 as similar to the third embodiment.

(5) In the embodiments and the above-mentioned variations, during the waiting state for the temperature drop in Step S8, the timer-counting started at the beginning of the supplemental charging (Step S5) is continued. However, the timer-counting may be interrupted at the beginning of Step S8, and when the routine returns to Step S8 to Step S5, the counting may be started for the remaining time.

(6) It may happen that the battery charger A becomes disconnected from the electrical outlet or the secondary battery B becomes disconnected from the battery charger during the charging. In such cases, it is possible to return to the initial state (Step S1) and to restart the charging.

(7) Heating devices for the cells are optional and not limited to heaters 4 of the above-described embodiments. For example, the battery case 1 may contain a heater which raises the atmospheric temperature therein.

E. Advantageous Effects of the Invention

As described above, according to the present invention, it is checked as to whether the connection is secured or not by means of the checking of the connection between the temperature sensing element and the charge-control unit. Accordingly, it is unnecessary to use special wiring or other elements for the checking, and the checking can be conducted economically. Besides, even if overcurrent has been discharged from the secondary battery or a short circuit exists at the inside of the secondary battery, it is possible to check the connection in spite of such problems.

INDUSTRIAL APPLICABILITY

The present invention can be utilized for a method for checking connection between a secondary battery and a battery charger, and for a checking device therefor. The secondary battery is preferably used for a power source of, e.g., an electric vehicle such as a human-driving vehicle with an auxiliary power source.

We claim:

1. A method for checking connection between a secondary battery and a battery charger for charging the secondary battery, said connection being made by a disconnectable connector, said battery charger comprises charging means for supplying electric current to said secondary battery through said connector, charge-control means for controlling said charging means, and a direct current power supply; said secondary battery comprises a temperature sensing element for sensing temperature of said secondary battery, said temperature sensing element having terminals, one of which is connected to said direct current power supply of said battery charger via said connector when said connection is secured, so that said temperature sensing element normally outputs a voltage according to said temperature of said secondary battery within a predetermined range; said method comprising connecting said charge-control means to one of said terminals sensing element when said connection is secured, comparing the output voltage with a preset voltage outside of only one end limit of a standard range of the voltage of the temperature sensing element and deciding that said connection is not secured when the voltage input to said charge-control means is beyond that one end limit.

2. A device for checking connection between a secondary battery and a battery charger for charging said secondary battery, said connection being made by a disconnectable connector, said secondary battery including a temperature sensing element for sensing, temperature of said secondary battery, said device being characterized in that it is located in said battery charger and comprises: a direct current power supply for supplying an electric current to said temperature sensing element when said connection is secured, so that said temperature sensing element outputs a voltage according to the temperature of said secondary batter; voltage detection means for detecting the output voltage of said temperature sensing element; storage means for storing only one end limit of a standard range of the voltage of said temperature sensing element; and decision means for deciding as to whether the voltage detected by said voltage detection means is outside of only that one end limit to determine if the connection is properly made.

3. A method as set forth in claim 2, wherein the comparison is only made at the high-end limit of the standard range.

4. A method as set forth in claim 1, wherein the comparison is only made at the lower end of the standard voltage range.

5. A device as set forth in claim 2, wherein the comparison is only made at the high-end limit of the standard range.

6. A device as set forth in claim 1, wherein the comparison is only made at the lower end of the standard voltage range.

* * * * *